United States Patent
Kawasaki et al.

(10) Patent No.: US 9,758,848 B2
(45) Date of Patent: *Sep. 12, 2017

(54) HIGH STRENGTH STEEL SHEET HAVING EXCELLENT FORMABILITY AND STABILITY OF MECHANICAL PROPERTIES AND METHOD FOR MANUFACTURING THE SAME

(75) Inventors: Yoshiyasu Kawasaki, Tokyo (JP);
Hiroshi Hasegawa, Tokyo (JP);
Shinjiro Kaneko, Tokyo (JP);
Yasunobu Nagataki, Tokyo (JP)

(73) Assignee: JFE Steel Corporation (JP)

( * ) Notice: Subject to any disclaimer, the term of this patent is extended or adjusted under 35 U.S.C. 154(b) by 452 days.

This patent is subject to a terminal disclaimer.

(21) Appl. No.: 14/113,397

(22) PCT Filed: Apr. 20, 2012

(86) PCT No.: PCT/JP2012/061305
§ 371 (c)(1),
(2), (4) Date: Oct. 23, 2013

(87) PCT Pub. No.: WO2012/147898
PCT Pub. Date: Nov. 1, 2012

(65) Prior Publication Data
US 2014/0050941 A1    Feb. 20, 2014

(30) Foreign Application Priority Data

Apr. 25, 2011  (JP) ................ 2011-096966
Jan. 27, 2012  (JP) ................ 2012-015060

(51) Int. Cl.
*C22C 38/02*    (2006.01)
*C22C 38/04*    (2006.01)
(Continued)

(52) U.S. Cl.
CPC .......... *C22C 38/38* (2013.01); *B32B 15/012* (2013.01); *B32B 15/013* (2013.01); *C21D 6/005* (2013.01);
(Continued)

(58) Field of Classification Search
None
See application file for complete search history.

(56) References Cited

U.S. PATENT DOCUMENTS 8,430,975 B2 * 4/2013 Nakagaito ............... C21D 1/25
148/320
2013/0037180 A1 * 2/2013 Sano .................... C21D 8/0436
148/603

FOREIGN PATENT DOCUMENTS

EP    1 865 085    12/2007
EP    1 975 266    10/2008
(Continued)

OTHER PUBLICATIONS

Machine-English translation of unexamined publication KR 2010-0057196, Dong-U Seo et al., May 31, 2010.*
(Continued)

*Primary Examiner* — Deborah Yee
(74) *Attorney, Agent, or Firm* — DLA Piper LLP (US)

(57) ABSTRACT

A high strength steel sheet including, by mass, C: 0.03% or more and 0.25% or less, Si: 0.4% or more and 2.5% or less, Mn: 3.5% or more and 10.0% or less, P: 0.1% or less, S: 0.01% or less, Al: 0.01% or more and 2.5% or less, N: 0.008% or less, Si+Al: 1.0% or more, the balance being Fe and inevitable impurities. The area ratio of ferrite is 30% or more and 80% or less, the area ratio of martensite is 0% or more and 17% or less, the volume fraction of retained austenite is 8% or more, and the average grain size of retained austenite is 2 μm or less.

22 Claims, 1 Drawing Sheet

(51) Int. Cl.
| | |
|---|---|
| C22C 38/06 | (2006.01) |
| C21D 8/02 | (2006.01) |
| B32B 15/18 | (2006.01) |
| C23C 2/06 | (2006.01) |
| C23C 2/12 | (2006.01) |
| C22C 38/38 | (2006.01) |
| C21D 9/46 | (2006.01) |
| C21D 6/00 | (2006.01) |
| C22C 38/00 | (2006.01) |
| B32B 15/01 | (2006.01) |
| C22C 38/08 | (2006.01) |
| C22C 38/12 | (2006.01) |
| C22C 38/14 | (2006.01) |
| C22C 38/16 | (2006.01) |
| C22C 38/24 | (2006.01) |
| C23C 2/02 | (2006.01) |
| C23C 2/28 | (2006.01) |
| C23C 2/40 | (2006.01) |

(52) U.S. Cl.
CPC ............ *C21D 8/0263* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/24* (2013.01); *C23C 2/02* (2013.01); *C23C 2/06* (2013.01); *C23C 2/12* (2013.01); *C23C 2/28* (2013.01); *C23C 2/40* (2013.01); *C21D 2211/001* (2013.01); *C21D 2211/005* (2013.01); *C21D 2211/008* (2013.01); *Y10T 428/12757* (2015.01); *Y10T 428/12799* (2015.01)

(56) References Cited

FOREIGN PATENT DOCUMENTS

| | | | |
|---|---|---|---|
| EP | 2 039 791 | 3/2009 | |
| EP | 2 415 891 | 2/2012 | |
| JP | 61-157625 A | 7/1986 | |
| JP | 01-259120 A | 10/1989 | |
| JP | 05-311323 A | 11/1993 | |
| JP | 2003-138345 A | 5/2003 | |
| JP | 2007-197819 A | 8/2007 | |
| JP | 2008-291304 | 12/2008 | |
| JP | 2009-521596 A | 6/2009 | |
| JP | 2010-196115 A | 9/2010 | |
| JP | WO 2011/093319 A1 * | 9/2011 | ........... C21D 8/0436 |
| KR | 2008-0073763 | 8/2008 | |
| KR | WO 2009/142362 A1 * | 11/2009 | |
| KR | 2010-0057196 | 5/2010 | |
| KR | 2011-0012367 | 2/2011 | |
| WO | 2010/114131 | 10/2010 | |

OTHER PUBLICATIONS

Machine-English translation of unexamined publication KR 10-2011-0012367, Hui-Jae Gang, Feb. 9, 2011.*
ASM. Table 1.1 Essential and incidental elements in steel and cast iron, p. 3, ASM, Metals Handbook, 10$^{th}$ edition, vol. 1.*
Machine-English translation of JP 05-311323, Ootalo Daigorou, Nov. 22, 1993.*
Extended European Search Report dated Nov. 10, 2014 from corresponding European Patent Application No. 12776590.7.
Korean Office Action dated Jan. 25, 2016 of Korean Application No. 2013-7029938 along with a Concise Statement of Relevance of Office Action in English.
Korean Office Action dated Oct. 25, 2016, of corresponding Korean Application No. 10-2013-7029938, along with a Concise Statement of Relevance of Office Action in English.
European Official Action dated Feb. 7, 2017, from corresponding European Application No. 12 776 590.7.

* cited by examiner

HIGH STRENGTH STEEL SHEET HAVING EXCELLENT FORMABILITY AND STABILITY OF MECHANICAL PROPERTIES AND METHOD FOR MANUFACTURING THE SAME

TECHNICAL FIELD

This disclosure relates to a high strength steel sheet having excellent formability and stability of mechanical properties, the steel sheet being suitable as a member for use in industrial fields such as the automotive industry and the electric industry, and a method of manufacturing the steel sheet.

BACKGROUND

Recently, improving fuel economy of automobiles has been an important issue from the viewpoint of global environmental conservation. Accordingly, there have been active movements to reduce the weight of car bodies by increasing the strength of the material of car bodies to thereby allow the thickness of the material to be reduced. However, an increase in the strength of a steel sheet results in deterioration of formability. Thus, currently, development of a material having both high strength and high formability has been anticipated. Moreover, when the high strength steel sheet is formed into a complicated shape such as that of automobile components, the occurrences of cracking and necking at an overhanging portion and a stretch flange portion are big issues. Thus, a high strength steel sheet having both high ductility and good hole expandability, the steel sheet being capable of overcoming the issues of the occurrences of cracking and necking, has been needed. Furthermore, increasing the strength of a steel sheet and reducing the thickness of a steel sheet significantly deteriorate shape fixability. To address this, in press-forming, a method of designing a die while expecting there to be a change in shape after releasing, which is estimated in advance, has been widely employed. However, when the tensile strength (TS) of a steel sheet varies, the deviation from the change in shape estimated by assuming a constant TS increases. Consequently, defects in shape occur and, therefore, individual reworking operations after the press-forming such as shaping by sheet metal processing, are necessary. As a result, mass production efficiency is significantly reduced. Thus, the TS variation of a steel sheet is required to be as small as possible.

For example, Japanese Unexamined Patent Application Publication No. 61-157625 proposes a high strength steel sheet having a tensile strength of 1000 MPa or more, a total elongation (EL) of 30% or more, and markedly high ductility, the steel sheet being manufactured using strain induced transformation of retained austenite. Such a steel sheet is manufactured by causing a steel sheet containing C, Si, and Mn as fundamental components to form austenite, subsequently quenching the steel sheet in the bainite transformation temperature range, and performing isothermal holding, namely, an austempering treatment. Retained austenite is formed due to the concentration of C in austenite caused by the austempering treatment, and formation of a large amount of retained austenite requires a large amount of added C exceeding 0.3%. However, an increase in the C concentration in steel deteriorates spot weldability and, in particular, a C concentration exceeding 0.3% significantly deteriorates spot weldability. Thus, it has been difficult to bring this technique into active use for steel sheets for use in automobiles. In addition, no consideration is given to hole expandability and stability of mechanical properties in JP '625 because the main purpose is to improve the ductility of a high strength thin steel sheet.

In Japanese Unexamined Patent Application Publication No. 1-259120, a good strength-ductility balance is achieved by heat-treating a high Mn steel in the ferrite-austenite dual-phase region. However, in JP '120, no analysis is performed on the improvement of ductility caused by concentrating Mn in untransformed austenite. Thus, there is a room to improve formability. In Japanese Unexamined Patent Application Publication No. 2003-138345, local ductility is improved by hot-rolling a high Mn steel, thereby causing a microstructure to include bainite and martensite, performing annealing and tempering to form fine retained austenite, and causing the microstructure to further include tempered bainite or tempered martensite. However, it is difficult to maintain strength because of the microstructure including a large amount of bainite or martensite formed by tempering at a high temperature. In addition, the amount of retained austenite is limited to improve the local ductility, which results in an insufficient amount of total elongation.

It could therefore be helpful to provide a high strength steel sheet having a steel composition including a low C content, a TS of 780 MPa or more, a TS×EL of 22000 MPa·% or more in addition to excellent hole expandability and stability of mechanical properties and a method of manufacturing the steel sheet.

SUMMARY

We found that it is possible to manufacture a high strength steel sheet having a steel composition including a low C content, a TS of 780 MPa or more, a TS×EL of 22000 MPa·% or more in addition to excellent hole expandability and stability of mechanical properties by adjusting alloy elements properly, performing an annealing treatment by holding in the temperature range of $Ac_1$ transformation point+10° C. to $Ac_1$ transformation point+($Ac_3$ transformation point−$Ac_1$ transformation point)/2 for 30 seconds or more and, subsequently, performing cooling to room temperature to form a microstructure which includes ferrite in an area ratio of 30% or more and 80% or less, martensite in an area ratio of 0% or more and 17% or less, and retained austenite in a volume fraction of 8% or more and in which an average grain size of retained austenite is 2 μm or less.

We thus provide:

(1) A high strength steel sheet having excellent formability and stability of mechanical properties, the steel sheet having a composition including, by mass, C: 0.03% or more and 0.25% or less, Si: 0.4% or more and 2.5% or less, Mn: 3.5% or more and 10.0% or less, P: 0.1% or less, S: 0.01% or less, Al: 0.01% or more and 2.5% or less, N: 0.008% or less, Al+Si: 1.0% or more, and the balance being Fe and inevitable impurities, wherein the steel sheet has a steel microstructure comprises an area ratio of ferrite: 30% or more and 80% or less, an area ratio of martensite: 0% or more and 17% or less and a volume fraction of retained austenite: 8% or more, and an average grain size of the retained austenite is 2 μm or less.

(2) The high strength steel sheet having excellent formability and stability of mechanical properties described in (1), wherein the steel microstructure further comprises an area ratio of tempered martensite: 5% or more.

(3) The high strength steel sheet having excellent formability and stability of mechanical properties described in (1) or (2), wherein the composition further includes, by mass, at least one element selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

(4) The high strength steel sheet having excellent formability and stability of mechanical properties described in any one of (1) to (3), wherein the composition further includes, by mass, at least one element selected from Ti: 0.01% or more and 0.1% or less, Nb: 0.01% or more and 0.1% or less, and B: 0.0003% or more and 0.0050% or less.

(5) The high strength steel sheet having excellent formability and stability of mechanical properties described in any one of (1) to (4), wherein the composition further includes, by mass, at least one element selected from Ca: 0.001% or more and 0.005% or less and REM: 0.001% or more and 0.005% or less.

(6) The high strength galvanized steel sheet having excellent formability and stability of mechanical properties described in any one of (1) to (5), further comprising a zinc-based coating on a surface of the steel sheet.

(7) The high strength galvanized steel sheet having excellent formability and stability of mechanical properties described in (6), wherein the zinc-based coating is a hot-dip galvanized coating or an alloyed hot-dip galvanized coating.

(8) The high strength aluminium-coated steel sheet having excellent formability and stability of mechanical properties described in any one of (1) to (5), further comprising an aluminium-based coating on a surface of the steel sheet.

(9) A method of manufacturing a high strength steel sheet having excellent formability and stability of mechanical properties, the method including hot-rolling a steel slab having the composition described in any one of (1), (3), (4), and (5), performing pickling, optionally performing cold-rolling, subsequently performing holding in a temperature range of $Ac_1$ transformation point+10° C. to $Ac_1$ transformation point+($Ac_3$ transformation point−$Ac_1$ transformation point)/2 for 30 seconds or more, performing cooling to room temperature, and optionally performing a tempering treatment in a temperature range of room temperature to 500° C. under the condition:

$$\exp[160/(580-T)] \times \ln(t) \leq 20$$

wherein,
T: Average holding temperature (° C.) in the temperature range of room temperature to 500° C.
t: Holding time (s) in the temperature range of room temperature to 500° C. exp(X) and ln(X) are the exponential function of X and the natural logarithm of X, respectively.

(10) A method of manufacturing a high strength galvanized steel sheet having excellent formability and stability of mechanical properties, the method including hot-rolling a steel slab having the composition described in any one of (1), (3), (4), and (5), performing pickling, optionally performing cold-rolling, subsequently performing holding in a temperature range of Ac1 transformation point+10° C. to Ac1 transformation point+(Ac3 transformation point−Ac1 transformation point)/2 for 30 seconds or more, performing cooling, and performing a hot-dip galvanizing treatment.

(11) A method of manufacturing a high strength galvanized steel sheet having excellent formability and stability of mechanical properties, the method including hot-rolling a steel slab having the composition described in any one of (1), (3), (4), and (5), performing pickling, optionally performing cold-rolling, subsequently performing holding in a temperature range of Ac1 transformation point+10° C. to Ac1 transformation point+(Ac3 transformation point−Ac1 transformation point)/2 for 30 seconds or more, performing cooling, performing a hot-dip galvanizing treatment, and then performing an alloying treatment of a galvanized coating in a temperature range of 470° C. to 600° C.

(12) A method of manufacturing a high strength aluminium-coated steel sheet having excellent formability and stability of mechanical properties, the method including hot-rolling a steel slab having the composition described in any one of (1), (3), (4), and (5), performing pickling, optionally performing cold-rolling, subsequently performing holding in a temperature range of Ac1 transformation point+10° C. to Ac1 transformation point+(Ac3 transformation point−Ac1 transformation point)/2 for 30 seconds or more, performing cooling, and performing a hot-dip aluminium-plating treatment.

Note that, in the description, when referring to a steel composition, "%" always denotes "% by mass." "High strength steel sheet" refers to a steel sheet having a tensile strength TS of 780 MPa or more.

A high strength steel sheet having a steel composition including a low C content, a TS of 780 MPa or more, a TS×EL of 22000 MPa·% or more in addition to excellent hole expandability and stability of mechanical properties can be produced. Our high strength steel sheet may be applied, for example, for automobile structural members. In this case, fuel economy is improved due to the reduction in the weight of car bodies. Therefore, the high strength steel sheet is highly valuable for industrial applications.

DETAILED DESCRIPTION

Hereinafter, our steel sheets and methods will be described in detail.
1) The reasons why the composition of steel is limited to the above-described ranges will be described.
C: 0.03% or More and 0.25% or Less
C is an element necessary to maintain a retained austenite phase. When the content of C is less than 0.03%, it is difficult to form the desired retained austenite. On the other hand, when an excessive amount of C exceeding 0.25% is added, the area ratio of martensite increases beyond 17%, which deteriorates hole expandability and stability of mechanical properties. In addition, spot weldability, arc weldability and the like are deteriorated because a welded zone and a heat-affected zone are considerably hardened and thus the mechanical characteristics of the welded zone are deteriorated. In this respect, the content of C is 0.03% or more and 0.25% or less and preferably 0.05% or more and 0.20% or less.

Si: 0.4% or More and 2.5% or Less

Si is effective in maintaining high ductility because it allows retained austenite to be formed and improves the work hardenability of ferrite. The minimum content of Si is 0.4% because a poor effect is produced when the content of added Si is less than 0.4%. However, adding an excessive amount of Si exceeding 2.5% causes deterioration of surface quality due to the occurrence of red scale or the like. Thus, the content of Si is 0.4% or more and 2.5% or less and preferably 0.5% or more and 2.0% or less.

Mn: 3.5% or More and 10.0% or Less

Mn is an element effective to stabilize austenite and promote formation of retained austenite. Such an effect is confirmed at a Mn content of 3.5% or more. However, adding an excessive amount of Mn exceeding 10.0% suppresses formation of ferrite, which deteriorates formability. In this respect, the content of Mn is 3.5% or more and 10.0% or less and preferably 4.0% or more and 7.0% or less.

P: 0.1% or Less

P is an element effective to increase the strength of a steel. However, adding an excessive amount of P exceeding 0.1% causes embrittlement due to grain boundary segregation, which deteriorates crashworthiness. Thus, the content of P is 0.1% or less.

S: 0.01% or Less

S forms inclusions such as MnS and thereby becomes a sources of deterioration of hole expandability and crashworthiness and formation of cracks along the metal flow in the welded zone. Thus, the content of S is desirably as low as possible. However, in terms of production cost, the content of S is 0.01% or less.

Al: 0.01% or More and 2.5% or Less

Al is an element that serves as a deoxidizer and is effective for cleanliness of steel. Therefore, Al is preferably added in a deoxidation step. The minimum content of Al is 0.01% because a poor effect is produced when the content of added Al is less than 0.01%. However, adding an excessive amount of Al increases the risk of the occurrence of cracks in a steel slab in continuous casting, thus leading to a reduction in productivity. In this respect, the content of Al is 0.01% or more and 2.5% or less and preferably 0.5% or more and 1.5% or less.

N: 0.008% or Less

N is an element that deteriorates the aging resistance of a steel most. Thus, the content of N is preferably as low as possible. However, an N content exceeding 0.008% causes significant deterioration of aging resistance. Thus, the content of N is 0.008% or less.

Si+Al: 1.0% or More

Si and Al are effective to reduce the variation of material quality because they allow the austenite-ferrite dual-phase region to be widened and consequently changes in the phase volume fractions of austenite and ferrite with a change in annealing temperature become small. In this respect, the content of Si+Al is 1.0% or more and preferably 1.5% or more.

The high strength steel sheet has a composition including the above-described fundamental components and the balance being Fe and inevitable impurities. Optionally, the components described below may be included depending on the desired characteristics.

At least one selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less Cr, V, and Mo may be optionally added as needed because they improve the balance between strength and ductility. Such an effect can be produced at Cr: 0.05% or more, V: 0.005% or more, and Mo: 0.005% or more. However, when an excessive amount of Cr, V, or Mo exceeding Cr: 1.0%, V: 0.5%, or Mo: 0.5% is added, the volume fraction of the second phase becomes excessively large. This raises the concern that, for example, deterioration of ductility due to a significant increase in strength may occur. In addition, this becomes a factor that increases cost. Thus, when these elements are added, the contents of Cr, V, and Mo are Cr: 0.05% or more and 1.0% or less, V: 0.005% or more and 0.5% or less, and Mo: 0.005% or more and 0.5% or less.

Ni and Cu are elements effective to strengthen a steel and may be used to strengthen a steel without problems as long as used within our range. The contents of Ni and Cu needed are each 0.05% or more to produce such an effect. On the other hand, when an excessive amount of Ni or Cu exceeding 1.0% is added, the ductility of a steel sheet is deteriorated. In addition, this becomes a factor that increases cost. Thus, when Ni or Cu is added, the contents of added Ni and Cu are each 0.05% or more and 1.0% or less.

At least one selected from Ti: 0.01% or more and 0.1% or less, Nb: 0.01% or more and 0.1% or less, and B: 0.0003% or more and 0.0050% or less Ti and Nb are effective in precipitation strengthening of a steel. Such an effect is produced when the content of Ti or Nb is 0.01% or more. Ti and Nb may be used to strengthen a steel without problems as long as used within our range. However, when the content of Ti or Nb exceeds 0.1%, ductility and shape fixability are deteriorated. In addition, this becomes a factor that increases cost. Thus, when Ti or Nb is added, the contents of added Ti and Nb are Ti: 0.01% or more and 0.1% or less and Nb: 0.01% or more and 0.1% or less.

B may be optionally added as needed because it suppresses formation and growth of ferrite from the austenite grain boundary. Such an effect can be produced at a B content of 0.0003% or more. However, when the content of B exceeds 0.0050%, formability is deteriorated. In addition, this becomes a factor that increases cost. Thus, when B is added, the content of B is 0.0003% or more and 0.0050% or less.

At least one selected from Ca: 0.001% or more and 0.005% or less and REM: 0.001% or more and 0.005% or less Ca and REM are elements effective to reduce the adverse effect of sulfides on hole expandability by forming the sulfides into a spherical shape. The content of Ca or REM needed is 0.001% or more to produce such an effect. However, when an excessive amount of Ca or REM exceeding 0.005% is added, the amount of inclusions or the like increases, which leads to, for example, the occurrence of surface and inner defects. Thus, when Ca or REM is added, the contents of added Ca and REM are each 0.001% or more and 0.005% or less.

2) Next, a steel microstructure will be described.

Ferrite Area Ratio: 30% or More and 80% or Less

Ductility is deteriorated when the area ratio of ferrite is less than 30%. It is difficult to maintain a TS of 780 MPa or more when the area ratio of ferrite exceeds 80%. Thus, the area ratio of ferrite is 30% or more and 80% or less.

Martensite Area Ratio: 0% or More and 17% or Less

It is difficult to maintain good hole expandability and stability of mechanical properties when the area ratio of martensite exceeds 17%. Thus, the area ratio of martensite is 0% or more and 17% or less.

Retained Austenite Volume Fraction: 8% or More

Retained austenite effectively improves the ductility of a steel. A targeted ductility cannot be achieved when the volume fraction of retained austenite is less than 8%. Thus, the volume fraction of retained austenite is 8% or more. The maximum volume fraction of retained austenite is not particularly specified, but is about 40% with consideration of the composition described above.

Retained Austenite Average Grain Size: 2 μm or Less

Propagation of cracks during hole-expanding cannot be suppressed when the average grain size of retained austenite exceeds 2 μm. As a result, it is difficult to maintain good hole expandability. Thus, the average grain size of retained austenite is 2 μm or less.

Tempered Martensite Area Ratio: 5% or More

Tempered martensite improves hole expandability by reducing the hardness difference among soft ferrite, hard martensite, and hard retained austenite. It is difficult to produce good hole expandability when the volume fraction of tempered martensite is less than 5%. Tempered martensite is a softened microstructure formed by tempering martensite, which significantly affects a TS. Thus, to maintain high stability of mechanical properties, the area ratio of tempered martensite is preferably 5% or more.

In addition to ferrite, retained austenite, tempered martensite, and martensite, carbides such as cementite, bainite, or pearlite may be formed. However, our desired conditions can be achieved when the above-described ratios of ferrite, retained austenite, and martensite are satisfied.

Optionally, the high strength steel sheet, on the surface of the steel sheet, a hot-dip galvanized coating formed by performing a hot-dip galvanizing treatment; a zinc-based coating such as an alloyed hot-dip galvanized coating formed by performing a hot-dip galvanizing treatment and subsequently performing an alloying treatment of the resulting galvanized coating; or an aluminium-based coating such as a hot-dip aluminium-coating formed by performing a hot-dip aluminium-plating.

3) Next, manufacturing conditions will be described.

A steel having the above-described composition is melted using a converter or the like and then cast into a slab by a continuous casting method or the like. The resulting steel is hot-rolled or hot-rolled followed by cold-rolling and subsequently subjected to an annealing treatment. Although there are no particular limitations on the manufacturing conditions for casting, hot-rolling, and cold-rolling, the preferred manufacturing conditions will be described below.

Casting Conditions

A steel slab used is preferably cast by a continuous casting method to prevent macro segregation of the components. However, an ingot-making method and a thin slab casting method may alternatively be employed. Moreover, in addition to a conventional method in which a steel slab, after being cast, is temporarily cooled to room temperature and subsequently heated again, an energy-saving process such as a direct rolling in which a hot steel slab, without being cooled to room temperature, is inserted into a heating furnace or heat-insulated for a short time and then immediately rolled can be applied without problems.

Hot-Rolling Conditions

Slab Heating Temperature: 1100° C. or More

Regarding the slab heating temperature, low-temperature heating is preferable from an energetic viewpoint. However, when the heating temperature is less than 1100° C., it is difficult to sufficiently dissolve carbides. This causes problems such as an increased risk of the occurrence of trouble caused in hot-rolling due to an increased rolling load. With consideration of an increase in scale loss with an increase in oxidized weight, the slab heating temperature is desirably 1300° C. or less.

A sheet-bar heater that heats sheet bars may be employed to prevent the trouble caused in hot-rolling even when the slab heating temperature is lowered.

Finish-Rolling End Temperature: $Ar_3$ Transformation Point or More

When a finish-rolling end temperature is less than an $Ar_3$ transformation point, the anisotropy of material characteristic may occur, which results in deterioration of formability. Thus, the finish-rolling temperature is desirably the $Ar_3$ transformation point or more.

Coiling Temperature: 450° C. or More and 700° C. or Less

When a coiling temperature is less than 450° C., it is difficult to control the coiling temperature, which is likely to result in temperature irregularities. As a result, problems such as deterioration of cold-rolling characteristics may occur. When the coiling temperature exceeds 700° C., problems such as the occurrence of decarbonization in the surface layer of a base iron may occur. Thus, the coiling temperature is desirably 450° C. or more and 700° C. or less.

In the hot-rolling step, a part or all of finish rolling may be a rolling with lubrication to reduce the rolling load in hot-rolling. Performing the rolling with lubrication is also effective to produce a steel sheet having a uniform shape and a uniform material quality. The coefficient of friction in the rolling with lubrication is preferably 0.25 to 0.10. In addition, a continuous-rolling process in which each sheet bar is joined with the previous and next sheet bars and continuously subjected to finish-rolling is preferably employed. It is desirable to employ the continuous-rolling process in terms of operational stability in hot-rolling. In the case where cold-rolling is further performed after pickling, a cold-rolled steel sheet having a predetermined thickness is formed. Cold-rolling conditions are not particularly limited and may be set in accordance with the conventional method.

Annealing Conditions

Holding in the Temperature Range of $Ac_1$ Transformation Point+10° C. to $Ac_1$ Transformation Point+($Ac_3$ Transformation Point−$Ac_1$ Transformation Point)/2 for 30 Seconds or More When the annealing treatment is performed in the austenite-ferrite dual-phase region, Mn concentrates on the austenite side and consequently the Mn concentration in austenite reaches a concentration equal to or greater than the Mn concentration of a steel composition. When an annealing temperature is less than $Ac_1$ transformation point+10° C., little austenite is formed. Thus, the desired retained austenite cannot be formed after annealing. When the annealing temperature exceeds $Ac_1$ transformation point+($Ac_3$ transformation point−$Ac_1$ transformation point)/2, an insufficient concentration of Mn in austenite occurs in annealing. Thus, the desired amount of retained austenite cannot be formed. When a holding time is less than 30 seconds, an insufficient concentration of Mn in austenite occurs in annealing. Thus, the desired amount of retained austenite cannot be formed. Furthermore, a large amount of unrecrystallized microstructure remains. Thus, the desired ductility and hole expandability cannot be achieved. As a result, the annealing conditions are as follows: holding in the temperature range of $Ac_1$ transformation point+10° C. to $Ac_1$ transformation point+($Ac_3$ transformation point−$Ac_1$ transformation point)/2 for 30 seconds or more.

Any annealing method such as continuous annealing or batch annealing may be employed. When cooling to room temperature is performed after annealing, the cooling method and cooling rate are not particularly specified and any cooling conditions such as furnace cooling or air cooling in batch annealing or gas jet cooling, mist cooling, or water cooling in continuous annealing may be employed.

Optionally, a tempering treatment described below may be performed after cooling to room temperature.

By performing the tempering treatment, martensite, which constitutes a part of the microstructure formed after cooling, is caused to transform into tempered martensite, and the hardness difference between soft ferrite (which transforms into hard martensite in hole-expanding) and retained austenite is reduced. Consequently, hole expandability can be improved. In addition, the area ratio of martensite can be controlled to be stably low by causing martensite to transform into tempered martensite. Furthermore, the stability of mechanical properties may be improved because the area ratio of the hard martensite relates to the variation of material quality.

Tempering Treatment Under the Conditions of the Temperature Range of Room Temperature to 500° C. and $\exp[160/(580-T)] \times \ln(t) \leq 20$ Where T: Average holding temperature (° C.) in the temperature range of room temperature to 500° C. and t: Holding time (s) in the temperature range of room temperature to 500° C. When the tempering treatment is performed in the temperature range exceeding 500° C., or when $\exp[160/(580-T)] \times \ln(t)$ exceeds 20, the desired amount of retained austenite cannot be formed and thus it is difficult to maintain TS×EL≥22000 MPa·%. Thus, a tempering condition is $\exp[160/(580-T)] \times \ln(t) \leq 20$. T is preferably 150° C. or more to maintain better hole expandability.

After the annealing treatment and the tempering treatment, optionally, a steel sheet may be subjected to temper-rolling to, for example, straighten its shape and adjust its surface roughness. Moreover, coating with a resin or fats and oil, various types of plating, and painting can be performed without problems.

The hot-dip galvanizing treatment may be optionally performed as follows. The steel sheet subjected to the annealing treatment is dipped in a galvanizing bath kept at 440° C. to 500° C. to perform the hot-dip galvanizing treatment. Subsequently, the amount of coating deposited is adjusted by gas wiping or the like. The content of Al in the galvanizing bath used in the hot-dip galvanizing is preferably 0.08% to 0.18%.

Performing the Alloying Treatment of the Galvanized Coating at 470° C. to 600° C.

The alloying treatment of the galvanized coating may be optionally performed by performing an alloying treatment of the galvanized coating at 470° C. to 600° C. after the hot-dip galvanizing treatment. When the alloying treatment is performed at a temperature exceeding 600° C., untransformed austenite transforms into pearlite. Thus, the desired amount of retained austenite cannot be maintained. As a result, ductility is deteriorated. Thus, when the alloying treatment of the galvanized coating is performed, the alloying treatment of the galvanized coating is performed at 470° C. to 600° C.

The hot-dip aluminium-plating treatment may be optionally performed as follows. The steel sheet subjected to the annealing treatment is dipped in an aluminium-plating bath kept at 660° C. to 730° C. to perform the hot-dip aluminium-plating treatment. Subsequently, the amount of coating deposited is adjusted by gas wiping or the like. When a steel is subjected to the hot-dip aluminium-plating treatment using the aluminium-plating bath having a temperature at $Ac_1$ transformation point+10° C. to $Ac_1$ transformation point+($Ac_3$ transformation point−$Ac_1$ transformation point)/2, fine and stable retained austenite is formed and thereby further improvement of ductility, that is, an increase in TS×EL, is possible.

EXAMPLES

Steels having certain compositions shown in Table 1 with the balance being Fe and inevitable impurities were each melted using a converter and cast into a slab by a continuous casting method. The resulting slabs were heated to 1250° C. and hot-rolled to a sheet thickness of 3.2 mm. Hot-rolling conditions were as follows: finish temperature of 900° C., cooling rate after rolling: 10° C./s, and coiling temperature: 600° C. After pickling, the hot-rolled steel sheets were cold-rolled to a sheet thickness of 1.4 mm and annealed under the manufacturing conditions shown in Table 2. In some Examples, a hot-dip galvanizing treatment, a hot-dip galvanizing treatment followed by an alloying treatment of a galvanized coating, or a hot-dip aluminium-plating was further performed. Nos. 35, 38, and 44 were hot-dip galvanized steel sheets. Nos. 36, 39, 41 to 43, and 47 were galvannealed steel sheets. Nos. 37, 40, and 46 were hot-dip aluminium-coated steel sheets.

A hot-dip galvanizing bath used to hot-dip galvanize steel sheets was a zinc bath containing Al: 0.19% with a bath temperature of 460° C. A hot-dip galvanizing bath used to galvanneal steel sheets was a zinc bath containing Al: 0.14% with a bath temperature of 460° C. The amount of galvanized coating was adjusted to 45 g/m² per side (double-side coating). In the alloying treatment, the Fe concentration in the coating was adjusted to 9% to 12% by mass. The temperature of a hot-dip aluminium-plating bath used for hot-dip aluminium-coated steel sheets was 700° C. In some Examples, the steel sheets, after being hot-rolled to a sheet thickness of 2.0 mm and pickled, were directly annealed under the manufacturing conditions shown in Table 2.

The resulting steel sheets were examined in terms of sectional microstructure, tensile characteristics, and hole expandability. Table 3 shows the results.

TABLE 1

| Steel type | Chemical composition (mass %) | | | | | | | | | | | | | | | | | Si + Al | $Ac_1$ transformation point (°C.) | $Ac_3$ transformation point (°C.) | Remarks |
|---|---|---|---|---|---|---|---|---|---|---|---|---|---|---|---|---|---|---|---|---|---|
| | C | Si | Mn | Al | P | S | N | Ni | Cu | Cr | V | Mo | Nb | Ti | B | Ca | REM | | | | |
| A | 0.125 | 1.21 | 4.22 | 0.790 | 0.023 | 0.0024 | 0.0038 | — | — | — | — | — | — | — | — | — | — | 2.00 | 644 | 924 | Example steel |
| B | 0.089 | 1.05 | 5.92 | 0.740 | 0.021 | 0.0020 | 0.0034 | — | — | — | — | — | — | — | — | — | — | 1.79 | 595 | 867 | Example steel |
| C | 0.370 | 0.72 | 2.85 | 0.028 | 0.018 | 0.0021 | 0.0030 | — | — | — | — | — | — | — | — | — | — | 0.75 | 673 | 739 | Comparative Example steel |
| D | 0.112 | 0.48 | 4.42 | 0.026 | 0.023 | 0.0024 | 0.0036 | — | — | — | — | — | — | — | — | — | — | 0.51 | 631 | 736 | Comparative Example steel |
| E | 0.092 | 1.05 | 5.03 | 0.920 | 0.024 | 0.0026 | 0.0032 | 0.29 | 0.22 | — | — | — | — | — | — | — | — | 1.97 | 614 | 920 | Example steel |
| F | 0.124 | 1.29 | 4.98 | 0.880 | 0.028 | 0.0028 | 0.0030 | — | — | 0.32 | — | — | — | — | — | — | — | 2.17 | 628 | 933 | Example steel |
| G | 0.089 | 1.51 | 4.55 | 0.732 | 0.025 | 0.0024 | 0.0031 | — | — | — | 0.064 | 0.21 | — | — | — | — | — | 2.24 | 640 | 934 | Example steel |
| H | 0.085 | 1.14 | 5.56 | 0.791 | 0.024 | 0.0019 | 0.0033 | — | — | — | — | — | 0.032 | — | — | — | — | 1.93 | 607 | 894 | Example steel |
| I | 0.151 | 1.32 | 5.22 | 1.040 | 0.029 | 0.0020 | 0.0034 | — | — | — | — | — | — | 0.018 | 0.0021 | — | — | 2.36 | 617 | 949 | Example steel |
| J | 0.121 | 1.18 | 4.55 | 0.720 | 0.024 | 0.0018 | 0.0029 | — | — | — | — | — | — | — | — | 0.0014 | 0.0020 | 1.90 | 635 | 900 | Example steel |
| K | 0.096 | 1.01 | 4.43 | 0.041 | 0.024 | 0.0019 | 0.0030 | — | — | — | — | — | — | — | — | — | — | 1.05 | 637 | 768 | Example steel |
| L | 0.320 | 1.48 | 1.77 | 0.039 | 0.023 | 0.0018 | 0.0031 | — | — | — | — | — | — | — | — | — | — | 1.52 | 713 | 816 | Comparative Example steel |

An $Ac_1$ transformation point and an $Ac_3$ transformation point can be calculated by the following expressions:

$Ac_1$ transformation point(° C.)=751−16×(%C)+11×(%Si)−28×(%Mn)−5.5×(%Cu)−16×(%Ni)+13×(%Cr)+3.4×(%Mo)

$Ac_3$ transformation point(° C.)=910−203√(%C)+45×(%Si)−30×(%Mn)−20×(%Cu)−15×(%Ni)+11×(%Cr)+32×(%Mo)+104×(%V)+400×(%Ti)+200×(%Al).

TABLE 2

| No. | Steel Type | Cold rolling | Annealing temperature: T1 °C. | Annealing time s | Average holding temperature: T2 °C. | Holding time: t s | exp[160/(580 − T2)] × ln(t) | Alloying temperature °C. | Remarks |
|---|---|---|---|---|---|---|---|---|---|
| 1 | A | Yes | 680 | 500 | — | — | — | — | Example |
| 2 | A | Yes | 700 | 500 | — | — | — | — | Example |
| 3 | A | Yes | 720 | 500 | — | — | — | — | Example |
| 4 | A | Yes | 680 | 500 | 360 | 500 | 12.9 | — | Example |
| 5 | A | Yes | 700 | 500 | 360 | 500 | 12.9 | — | Example |
| 6 | A | Yes | 720 | 500 | 360 | 500 | 12.9 | — | Example |
| 7 | A | No | 700 | 500 | — | — | — | — | Example |
| 8 | A | Yes | 510 | 500 | — | — | — | — | Comparative Example |
| 9 | A | Yes | 830 | 500 | — | — | — | — | Comparative Example |
| 10 | A | Yes | 700 | 10 | — | — | — | — | Comparative Example |
| 11 | A | Yes | 700 | 500 | 700 | 1800 | 2.0 | — | Comparative Example |
| 12 | A | Yes | 700 | 500 | 450 | 3600 | 28.0 | — | Comparative Example |
| 13 | B | Yes | 660 | 300 | — | — | — | — | Example |
| 14 | B | Yes | 680 | 300 | — | — | — | — | Example |
| 15 | B | Yes | 700 | 300 | — | — | — | — | Example |
| 16 | B | No | 680 | 300 | — | — | — | — | Example |
| 17 | C | Yes | 680 | 300 | — | — | — | — | Example |
| 18 | C | Yes | 700 | 300 | — | — | — | — | Comparative Example |
| 19 | C | Yes | 720 | 300 | — | — | — | — | Comparative Example |
| 20 | D | Yes | 645 | 500 | — | — | — | — | Comparative Example |
| 21 | D | Yes | 665 | 500 | — | — | — | — | Example |
| 22 | D | Yes | 685 | 500 | — | — | — | — | Comparative Example |
| 23 | E | Yes | 700 | 300 | — | — | — | — | Example |
| 24 | E | Yes | 740 | 300 | — | — | — | — | Example |
| 25 | F | Yes | 680 | 300 | — | — | — | — | Example |
| 26 | F | Yes | 720 | 300 | — | — | — | — | Example |
| 27 | G | Yes | 680 | 400 | — | — | — | — | Example |
| 28 | G | Yes | 720 | 400 | — | — | — | — | Example |
| 29 | H | Yes | 680 | 300 | — | — | — | — | Example |
| 30 | H | Yes | 720 | 300 | — | — | — | — | Example |
| 31 | I | Yes | 700 | 300 | — | — | — | — | Example |
| 32 | I | Yes | 740 | 300 | — | — | — | — | Example |
| 33 | J | Yes | 700 | 500 | — | — | — | — | Example |
| 34 | J | Yes | 740 | 500 | — | — | — | — | Example |
| 35 | A | Yes | 670 | 900 | — | — | — | — | Example |
| 36 | A | Yes | 670 | 900 | — | — | — | 560 | Example |
| 37 | A | Yes | 670 | 900 | — | — | — | — | Example |
| 38 | B | Yes | 650 | 1200 | — | — | — | — | Example |
| 39 | B | Yes | 650 | 1200 | — | — | — | 560 | Example |
| 40 | B | Yes | 650 | 1200 | — | — | — | — | Example |
| 41 | K | Yes | 650 | 300 | — | — | — | 550 | Example |
| 42 | K | Yes | 670 | 300 | — | — | — | 550 | Example |
| 43 | K | Yes | 690 | 300 | — | — | — | 550 | Example |
| 44 | K | Yes | 650 | 300 | — | — | — | — | Example |
| 45 | K | Yes | 650 | 300 | 360 | 500 | 12.9 | — | Example |
| 46 | K | Yes | 650 | 300 | — | — | — | — | Example |
| 47 | L | Yes | 760 | 300 | — | — | — | 550 | Comparative Example |

Underlined value: Out of the scope of our steel sheets and methods

TABLE 3

| No. | Steel type | Sheet thickness (mm) | F area ratio (%) | RA volume fraction (%) | M area ratio (%) | TM area ratio (%) | RA average grain size (μm) | TS (MPa) | EL (%) | λ (%) | TS × EL (MPa · %) | ΔTS/Δ20° C. | Type | Remarks |
|---|---|---|---|---|---|---|---|---|---|---|---|---|---|---|
| 1 | A | 1.4 | 68 | 14 | 8 | 8 | 1.2 | 1200 | 23.1 | 42 | 27720 | 55 | CR | Example |
| 2 | A | 1.4 | 60 | 19 | 9 | 10 | 1.0 | 1240 | 22.0 | 38 | 27280 | | CR | Example |
| 3 | A | 1.4 | 55 | 22 | 10 | 12 | 0.9 | 1310 | 20.6 | 36 | 26986 | | CR | Example |
| 4 | A | 1.4 | 70 | 13 | 2 | 14 | 0.9 | 1000 | 28.1 | 52 | 28100 | 35 | CR | Example |
| 5 | A | 1.4 | 62 | 17 | 3 | 17 | 1.1 | 1040 | 27.4 | 54 | 28496 | | CR | Example |
| 6 | A | 1.4 | 58 | 20 | 3 | 18 | 1.0 | 1070 | 26.9 | 58 | 28783 | | CR | Example |
| 7 | A | 2.0 | 61 | 18 | 8 | 11 | 1.4 | 1210 | 23.4 | 46 | 28314 | 65 | HR | Example |
| 8 | A | 1.4 | 79 | 2 | 4 | 4 | 0.3 | 1270 | 13.9 | 21 | 17653 | 65 | CR | Comparative Example |
| 9 | A | 1.4 | 26 | 6 | 46 | 18 | 0.2 | 1480 | 11.8 | 10 | 17464 | 65 | CR | Comparative Example |
| 10 | A | 1.4 | 70 | 4 | 4 | 4 | 0.3 | 1280 | 13.9 | 22 | 17792 | 60 | CR | Comparative Example |
| 11 | A | 1.4 | 63 | 2 | 8 | 11 | 0.3 | 1090 | 15.4 | 31 | 16786 | 60 | CR | Comparative Example |
| 12 | A | 1.4 | 64 | 3 | 10 | 10 | 0.2 | 1120 | 14.8 | 32 | 16576 | 65 | CR | Comparative Example |
| 13 | B | 1.4 | 52 | 25 | 9 | 12 | 1.0 | 1260 | 34.5 | 38 | 43470 | 55 | CR | Example |
| 14 | B | 1.4 | 45 | 29 | 10 | 14 | 0.9 | 1320 | 32.4 | 36 | 42768 | | CR | Example |
| 15 | B | 1.4 | 39 | 32 | 11 | 16 | 0.8 | 1370 | 30.2 | 33 | 41374 | | CR | Example |
| 16 | B | 2.0 | 48 | 26 | 9 | 14 | 1.1 | 1230 | 32.2 | 36 | 39608 | 50 | HR | Example |
| 17 | C | 1.4 | 71 | 6 | 18 | 3 | 3.3 | 1140 | 18.4 | 22 | 20976 | 120 | CR | Comparative Example |
| 18 | C | 1.4 | 67 | 5 | 23 | 3 | 2.9 | 1260 | 16.6 | 21 | 20916 | | CR | Comparative Example |
| 19 | C | 1.4 | 57 | 6 | 32 | 3 | 3.2 | 1380 | 14.9 | 20 | 20562 | | CR | Comparative Example |
| 20 | D | 1.4 | 63 | 16 | 18 | 2 | 2.8 | 970 | 24.8 | 16 | 24056 | 165 | CR | Comparative Example |
| 21 | D | 1.4 | 51 | 19 | 26 | 3 | 2.9 | 1130 | 21.7 | 14 | 24521 | | CR | Comparative Example |
| 22 | D | 1.4 | 36 | 21 | 38 | 4 | 2.7 | 1300 | 18.9 | 13 | 24570 | | CR | Comparative Example |
| 23 | E | 1.4 | 53 | 24 | 9 | 12 | 1.1 | 1190 | 23.2 | 43 | 27608 | 55 | CR | Example |
| 24 | E | 1.4 | 40 | 31 | 11 | 16 | 0.9 | 1300 | 21.5 | 39 | 27950 | | CR | Example |
| 25 | F | 1.4 | 52 | 22 | 10 | 14 | 1.0 | 1200 | 23.3 | 40 | 27960 | 60 | CR | Example |
| 26 | F | 1.4 | 39 | 28 | 11 | 19 | 1.2 | 1320 | 21.2 | 36 | 27984 | | CR | Example |
| 27 | G | 1.4 | 56 | 22 | 9 | 11 | 1.1 | 1210 | 22.9 | 42 | 27709 | 55 | CR | Example |
| 28 | G | 1.4 | 43 | 29 | 10 | 15 | 0.8 | 1320 | 21.1 | 40 | 27852 | | CR | Example |
| 29 | H | 1.4 | 58 | 20 | 9 | 11 | 0.9 | 1240 | 22.2 | 37 | 27528 | 60 | CR | Example |
| 30 | H | 1.4 | 45 | 27 | 10 | 14 | 1.1 | 1360 | 20.4 | 35 | 27744 | | CR | Example |
| 31 | I | 1.4 | 58 | 19 | 10 | 11 | 1.1 | 1190 | 22.9 | 41 | 27251 | 55 | CR | Example |
| 32 | I | 1.4 | 44 | 25 | 9 | 19 | 1.2 | 1300 | 21.5 | 38 | 27950 | | CR | Example |
| 33 | J | 1.4 | 53 | 18 | 10 | 16 | 1.1 | 1210 | 22.9 | 42 | 27709 | 55 | CR | Example |
| 34 | J | 1.4 | 40 | 24 | 10 | 22 | 0.8 | 1320 | 21.1 | 40 | 27852 | | CR | Example |
| 35 | A | 1.4 | 70 | 17 | 6 | 6 | 1.1 | 1090 | 27.8 | 32 | 30302 | 45 | GI | Example |
| 36 | A | 1.4 | 71 | 16 | 6 | 6 | 1.0 | 1080 | 28.2 | 33 | 30456 | 50 | GA | Example |
| 37 | A | 1.4 | 70 | 20 | 5 | 5 | 0.8 | 1120 | 30.1 | 33 | 33712 | 55 | Al | Example |
| 38 | B | 1.4 | 52 | 26 | 12 | 9 | 0.9 | 1240 | 35.2 | 32 | 43648 | 65 | GI | Example |
| 39 | B | 1.4 | 53 | 27 | 11 | 8 | 1.0 | 1250 | 34.9 | 31 | 43625 | 70 | GA | Example |
| 40 | B | 1.4 | 54 | 31 | 7 | 7 | 1.2 | 1320 | 35.2 | 32 | 46464 | 65 | Al | Example |
| 41 | K | 1.4 | 70 | 12 | 10 | 6 | 1.0 | 990 | 27.8 | 33 | 27522 | 45 | GA | Example |
| 42 | K | 1.4 | 69 | 14 | 11 | 6 | 1.0 | 1030 | 26.5 | 31 | 27295 | | GA | Example |
| 43 | K | 1.4 | 70 | 13 | 11 | 6 | 1.0 | 1080 | 24.8 | 31 | 26784 | | GA | Example |
| 44 | K | 1.4 | 71 | 11 | 10 | 6 | 1.1 | 1000 | 27.6 | 31 | 27600 | 50 | GI | Example |
| 45 | K | 1.4 | 70 | 11 | 6 | 12 | 1.0 | 980 | 28.4 | 42 | 27832 | 50 | CR | Example |
| 46 | K | 1.4 | 69 | 16 | 9 | 6 | 1.1 | 1040 | 29.1 | 32 | 30264 | 55 | Al | Example |
| 47 | L | 1.4 | 68 | 3 | 6 | 2 | 0.4 | 920 | 21.8 | 30 | 20056 | 70 | GA | Comparative Example |

Underlined value: Out of the scope of our steel sheets and methods
F: Ferrite,
RA: Retained austenite,
M: Martensite,
TM: Tempered martensite
HR: Hot-rolled steel sheet,
CR: Cold-rolled steel sheet,
GI: Hot-dip galvanized steel sheet,
GA: Galvannealed steel sheet,
Al: Hot-dip aluminium-coated steel sheet The area ratios of ferrite and tempered martensite were calculated as follows. The thickness-direction cross-section parallel to the rolling direction of a steel sheet was polished and corroded with a 3% nital. Then, 10 fields of view were observed with a SEM (scanning electron microscope) at a 2000-fold magnification. Each phase was colored with a different color on a transparent OHP sheet. The resulting image was captured and the areas of targeted crystal grains were determined using Image-Pro produced by Media Cybernetics, Inc. The total sum of these areas was divided by the total area to calculate the area ratios. The volume fraction of retained austenite was determined by grinding the steel sheet until a plane at ¼ thickness position was exposed and measuring the intensity of X-ray diffraction on the plane at ¼ thickness position. The incident X-ray was MoKα radiation. The intensity ratio was calculated for all combinations of the peak integrated intensities of {111}, {200}, {220}, and {311} planes of the retained austenite phase and {110}, {200}, and {211} planes of ferrite, and their average was considered as the volume fraction of retained austenite. The area ratio of martensite was determined by subtracting, from the whole, the area ratios of ferrite and tempered martensite determined above, the volume fraction of retained austenite determined above, and area ratios of other phases capable of being identified by a SEM (carbides such as cementite, bainite, and pearlite). The average grain size of retained austenite was determined by observing 20 pieces of retained austenite with a TEM (transmission electron microscope), determining the area of each piece using the above-mentioned Image-Pro, calculating their equivalent circle diameters, and averaging the equivalent circle diameters.

A tensile test was conducted in accordance with JIS Z 2241 (1998) using a JIS No. 5 test piece that was a sample taken so that its tensile direction was perpendicular to the rolling direction of the steel sheet, and a TS (tensile strength) and an EL (total elongation) were measured. It was evaluated that high ductility was achieved when TS×EL≥22000 MPa·%.

Hole expandability (stretch flangeability) was examined in accordance with The Japan Iron and Steel Federation Standard JFST 1001 (2008). Each prepared steel sheet was cut into a 100 mm×100 mm piece, and a hole having a diameter of 10 mm was punched with a clearance of 12%±1% for a sheet thickness of 2.0 mm or more and with a clearance of 12%±2% for a sheet thickness of less than 2.0 mm. Then, a 60° conical punch was inserted into the hole while a die having an inside diameter of 75 mm held the steel sheet at a blank-holding force of 9 tons, and the diameter of the hole at the cracking-initiation limit was measured. The critical hole-expansion ratio λ(%) was calculated by the following expression, and the stretch flangeability was evaluated on the basis of the critical hole-expansion ratio:

$$\text{critical hole-expansion ratio } \lambda(\%)=\{(D_f-D_0)/D_0\}\times 100$$

where $D_f$ is a hole diameter (mm) at the initiation of cracking and $D_0$ is an initial hole-diameter (mm). The hole expandability was evaluated as good when λ≥30(%).

The stability of mechanical properties was evaluated as follows. TS variation was examined for steel sheets prepared under the same conditions except for the annealing temperature T1 and prepared with different annealing temperatures T1. Then, the variation (ΔTS) per 20° C. change in annealing temperature was calculated from the TS variation. The evaluation was conducted on the basis of the TS variation (ΔTS). The stability of mechanical properties was evaluated as good when the TS variation per 20° C. (ΔTS/Δ20° C.) was 80 MPa or less.

Figure 1:
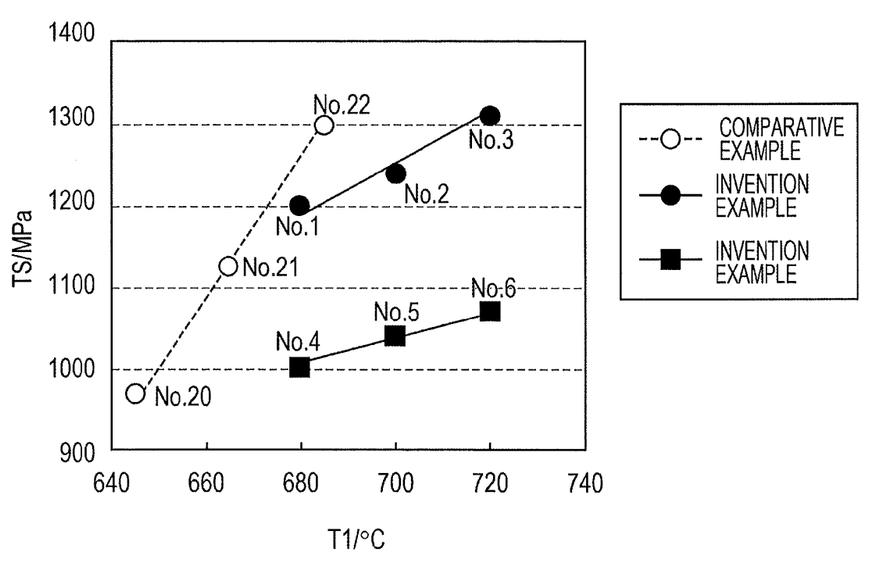
FIG. 1 is a diagram showing the relationship between annealing temperature (T1) and TS.

FIG. 1 shows the relationship between the annealing temperature (T1) and TS of Nos. 1 to 3 (Examples, without the tempering treatment), Nos. 4 to 6 (Examples, with the tempering treatment), and Nos. 20 to 22 (Comparative Examples) manufactured in Examples. In Nos. 20 to 22, the TS variation was wide; the TS variation per 20° C. was 165 MPa. In contrast, in Nos. 1 to 3, the TS variation was small; the TS variation per 20° C. was 55 MPa, which was half or less of the TS variation of Nos. 20 to 22. In Nos. 4 to 6, where the tempering treatment was performed, the TS variation was further smaller than that of Nos. 1 to 3; the TS variation per 20° C. was 35 MPa.

In the Examples, all the high strength steel sheet had a TS of 780 MPa or more, a TS×EL of 22000 MPa·% or more, a λ of 30% or more, the TS variation per 20° C. of 80 MPa or less. Thus, high strength steel sheets having excellent formability and stability of mechanical properties were produced. In some Examples where the tempering treatment was performed by our method after cooling to room temperature, high strength steel sheets having a higher λ and more excellent stability of mechanical properties were produced. On the other hand, in the Comparative Examples, although the TS was 780 MPa or more, one or more characteristics of TS×EL, λ, or the TS variation per 20° C. was deteriorated.

In Nos. 37, 40, and 46 (hot-dip aluminium-coated steel sheets), steels were prepared using an aluminium-plating bath having a temperature of $Ac_1$ transformation point+10° C. to $Ac_1$ transformation point+($Ac_3$ transformation point−$Ac_1$ transformation point)/2. Thus, a higher TS×EL than those of a cold-rolled steel sheet, a hot-dip galvanized steel sheet, and a galvannealed steel sheet were achieved. In No. 47, (galvannealed steel sheet), the steel composition included a high C content and a low Mn content, which was not within our range. Thus, untransformed austenite transformed into pearlite in alloying. Consequently, the desired amount of retained austenite could not be maintained. As a result, a high TS×EL could not be achieved.

INDUSTRIAL APPLICABILITY

Our high strength steel sheets have a steel composition including a low C content, a TS of 780 MPa or more, and a TS×EL of 22000 MPa·% or more, that is, high ductility, in addition to excellent hole expandability and stability of mechanical properties. Our high strength steel sheets may be applied, for example, for automobile structural members. In this case, fuel economy is improved due to the reduction in the weight of car bodies. Therefore, our high strength steel sheets are highly valuable for industrial applications.

The invention claimed is:

1. A high strength steel sheet having excellent formability and stability of mechanical properties, the steel sheet having a composition including, by mass, C: 0.03% or more and 0.25% or less, Si: 1.01% or more and 2.5% or less, Mn: 4.22% or more and 10.0% or less, P: 0.1% or less, S: 0.01% or less, Al: 0.01% or more and 2.5% or less, N: 0.008% or less, Si+Al: 1.0% or more, and the balance being Fe and inevitable impurities, wherein the steel sheet has a steel microstructure comprising an area ratio of ferrite: 30% or more and 80% or less, an area ratio of martensite: 0% or more and 17% or less and a volume fraction of retained austenite: 8% or more, an average grain size of the retained austenite is 2μm or less, and an area ratio of tempered martensite: 5% or more.

2. The high strength steel sheet according to claim 1, wherein the composition further comprises, by mass, at least one element selected from the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

3. The high strength steel sheet according to claim 1, wherein the composition further comprises, by mass, at least one element selected from the group consisting of Ti: 0.01% or more and 0.1% or less, Nb: 0.01% or more and 0.1% or less, and B: 0.0003% or more and 0.0050% or less.

4. The high strength steel sheet according to claim 1, wherein the composition further comprises, by mass, at least one element selected from the group consisting of Ca: 0.001% or more and 0.005% or less and REM: 0.001% or more and 0.005% or less.

5. The high strength steel sheet according to claim 1, further comprising a zinc-based coating on a surface of the steel sheet.

6. The high strength steel sheet according to claim 5, wherein the zinc-based coating is a hot-dip galvanized coating or an alloyed hot-dip galvanized coating.

7. The high strength steel sheet according to claim 1, further comprising an aluminium-based coating on a surface of the steel sheet.

8. A method of manufacturing a high strength steel sheet comprising:
- hot-rolling a steel slab having the composition according to claim 1;
- performing pickling;
- optionally performing cold-rolling;
- subsequently performing holding at a temperature of $Ac_1$ transformation point+10° C. to $Ac_1$ transformation point+($Ac_3$ transformation point−$Ac_1$ transformation point)/2 for 30 seconds or more;
- performing cooling to room temperature; and
- optionally performing a tempering treatment at a temperature of room temperature to 500° C. under a condition:

$$\exp[160/(580-T)] \times \ln(t) \leq 20$$

wherein,
- T: Average holding temperature (° C.) in a range of room temperature to 500° C.
- t: Holding time (s) in a range of room temperature to 500° C.
- exp(X) and ln(X) are an exponential function of X and a natural logarithm of X, respectively.

9. A method of manufacturing a high strength steel sheet according to claim 1 comprising:
- hot-rolling a steel slab having the composition;
- perfoll ing pickling;
- optionally performing cold-rolling;
- subsequently performing holding at a temperature of $Ac_1$ transformation point+10° C. to $Ac_1$ transformation point+($Ac_3$ transformation point−$Ac_1$ transformation point)/2 for 30 seconds or more;
- performing cooling; and
- performing a hot-dip galvanizing treatment.

10. A method of manufacturing a high strength steel sheet according to claim 1 comprising:
- hot-rolling a steel slab having the composition;
- performing pickling;
- optionally performing cold-rolling;
- subsequently performing holding at a temperature of $Ac_1$ transformation point+10° C. to $Ac_1$ transformation point+($Ac_3$ transformation point−$Ac_1$ transformation point)/2 for 30 seconds or more;
- performing cooling;
- performing a hot-dip galvanizing treatment; and
- performing an alloying treatment of a galvanized coating at 470° C. to 600° C.

11. A method of manufacturing a high strength steel according to claim 1 sheet comprising:
- hot-rolling a steel slab having the composition;
- performing pickling;
- optionally performing cold-rolling;
- subsequently performing holding at a temperature of $Ac_1$ transformation point+10° C. to $Ac_1$ transformation point+($Ac_3$ transformation point−$Ac_1$ transformation point)/2 for 30 seconds or more;
- performing cooling; and
- performing a hot-dip aluminium-plating treatment.

12. The high strength steel sheet according to claim 2, wherein the composition further comprises, by mass, at least one element selected from the group consisting of Ti: 0.01% or more and 0.1% or less, Nb: 0.01% or more and 0.1% or less, and B: 0.0003% or more and 0.0050% or less.

13. The high strength steel sheet according to claim 2, wherein the composition further comprises, by mass, at least one element selected from the group consisting of Ca: 0.001% or more and 0.005% or less and REM: 0.001% or more and 0.005% or less.

14. The high strength steel sheet according to claim 3, wherein the composition further comprises, by mass, at least one element selected from the group consisting of Ca: 0.001% or more and 0.005% or less and REM: 0.001% or more and 0.005% or less.

15. The high strength steel sheet according to claim 2, further comprising a zinc-based coating on a surface of the steel sheet.

16. The high strength steel sheet according to claim 1, wherein a volume fraction of retained austenite is 11% or more.

17. The high strength steel sheet according to claim 1, wherein TS variation per 20° C. of annealing temperature (ΔTS/Δ20° C.) is 80 MPa or less.

18. The high strength steel sheet according to claim 1, wherein TS variation per 20° C. of annealing temperature (ΔTS/Δ20° C.) is 50 MPa or less.

19. The high strength steel sheet according to claim 1, wherein TS×El is 26784 MPa % or more.

20. The high strength steel sheet according to claim 1, wherein TS is 980 MPa or more.

21. The high strength steel sheet according to claim 1, wherein Al is 0.5% or more and 2.5% or less.

22. The high strength steel sheet according to claim 12, wherein the composition further comprises, by mass, at least one element selected from the group consisting of Ca: 0.001% or more and 0.005% or less and REM: 0.001% or more and 0.005% or less.

* * * * *